May 13, 1969 W. W. WOODBURY 3,444,540

RANDOM ACCESS MEMORY SYSTEM

Filed April 14, 1965

WILLIAM W. WOODBURY
INVENTOR.

BY Robert G. Clay

ATTORNEY

WILLIAM W. WOODBURY
INVENTOR.

BY Robert G. Clay

ATTORNEY

WILLIAM W. WOODBURY
INVENTOR.

BY Robert G. Clay

ATTORNEY

WILLIAM W. WOODBURY
INVENTOR.

BY Robert G. Clay

ATTORNEY

WILLIAM W. WOODBURY
INVENTOR.

BY
Robert G. Clay
ATTORNEY

WILLIAM W. WOODBURY
INVENTOR.

BY Robert G. Clay

ATTORNEY

WILLIAM W. WOODBURY
INVENTOR.

BY Robert S. Clay
ATTORNEY

United States Patent Office 3,444,540

Patented May 13, 1969

3,444,540

RANDOM ACCESS MEMORY SYSTEM

William White Woodbury, San Francisco, Calif., assignor to Ampex Corporation, Redwood City, Calif., a corporation of California Filed Apr. 14, 1965, Ser. No. 448,094
Int. Cl. G11b 5/00
U.S. Cl. 340—174.1 2 Claims

ABSTRACT OF THE DISCLOSURE

A magnetic memory employing electromechanical accessing is provided for obtaining economical storage and retrieval of data. Plaques having magnetic coating are stored in packs for selective and rapid movement to and from a recording/playback station. At such station a rotating drum having a plurality of magnetic transducers spaced circumferentially thereon either writes or plays back the data. To control the spacing between the plaque and the rotating heads of the drum suitably contoured recesses are provided in the drum between the transducers and act on one side of the plaque. A pneumatic pressure pad acts on the other side of the plaque.

This invention relates to a memory system. In particular, the invention pertains to a memory system employing a rigid record plaque that is separated from a rotating drum carrying a plurality of transducers and that is selectively positioned with respect to the transducers.

In prior art memory systems there is a class of mechanical devices generally referred to as random access memory systems. These systems are generally designed to retrieve large amounts of information comparable to magnetic tape memory systems, but with the information more or less directly accessible, rather than being only sequentially accessible, as in the case with magnetic tape memory systems. Magnetic core, as well as magnetic thin film, and other memory systems are random access systems which are faster in operation than mechanical memory systems since all data is accessible in a matter of nanoseconds, or at most of microseconds. The drawback in such systems is that the cost per character is too high to make them practical for on line storage of large files. Other prior art mechanical systems have combined a rotating magnetic record disk with selectively positioned transducers. The disks in such systems typically have diameters in excess of 9 inches, and many are about 36 inches. The recording surface area of a 36 inch disk is about 500 square inches and the weight is about 7 lbs. Both large and smaller disks are difficult to manufacture as they must be flat, smooth, and devoid of any imperfections in order to accomplish reliable recording and enable effective transducer movement. To realize these goals requires the highest order of special machining and quality control. This in turn increases the cost of such prior art systems. In addition, the disks are difficult to handle and change notwithstanding recent cartridge innovations. The transducers that move over the rotating disk have also presented a problem. The forces acting on the transducer, in an arrangement where the heads are not rigidly mounted, tend to misalign and tilt their orientation. In addition, large power supplies are necessary to move the heads.

There have been other prior art random access memory systems, such as described in U.S. Patent 3,144,642, issued to R. C. Treseder on Aug. 11, 1964, which have employed large and heavy record members in contact with a rotating drum having movable transducers mounted thereon. The record members which are stationary are accessed by rotating the drum at a high speed and moving the heads to various positions during this rotation. The large record members of such a system are as difficult to fabricate and handle as disks. A head tilting problem is present in such a system.

The invented system overcomes the prior art shortcomings by providing a random access which employs a selectively positioned plaque or record card and a rotating drum having a plurality of rigidly mounted transducers. The plaque is typically covered with a magnetic material to facilitate high density recording, has a weight of less than an ounce, and an approximate total area of less than fifteen square inches. The plaque is preferably substantially rigid or non-flexible, to the extent of being not readily bendable about a curved path. In some arrangements of the invention, a more flexible card or piece of tape held rigid by auxiliary means such as a rigid frame may be employed. The terms "rigid" or "non-flexible" as employed in the ensuing description are thus intended to refer to the substantially non-bendable condition of the plaques during their manipulation in the access process, and not necessarily to the condition of the plaque per se. The substantially rigid condition of the plaque facilitates the pushing and pulling of the record member and enables an air bearing support to be formed. The low weight coupled with the air bearing support of the record member enables high speed movement of the plaque and drum to be achieved. The pushing and pulling of the plaque to locate any track thereon enables relatively simple transport means to be employed for accessing the plaque. The capability to access the plaque in this manner enables read and write operations to be performed by a high speed rotating drum with a plurality of transducers rigidly mounted thereon. The transducers may be rigidly mounted on different concentric circles of the drum and in offset relationship to one another. Thus, by rapidly moving the light weight low inertia plaque to selected stationary positions, the offset transducers access many thousands of bits and many tracks in a single revolution of the drum.

Briefly, the preferred structure of the invention comprises a substantially rigid co-planar plaque or record card, a pluraltiy of transducers, a drum having a circumferential region bounded by at least one planar end located adjacent the plaque with a plurality of the transducers mounted thereon, means for rotating the drum at speeds that create an air bearing between the plaque and the transducers, and pressure pad means mounted adjacent the other side of the plaque for applying a pressure to control the separation between the plane of the drum and the plaque.

The above generally described structure and system is applicable to (1) a simple read or write station for a single plaque which is compatible with every day credit transactions; (2) a double plaque reading system compatible with small memory and sorting requirements and control systems; (3) a computer or data processing system containing from about a hundred to many thousands of plaques and many millions of bits of information; (4) the recording of analog signals or digital signals; and (5) the recording of television or viedo signals and single frames thereof. These are but a few of the many applications of the invented system. For this reason the specific embodiment which is described shall only be considered illustrative of one desirable arrangement that emplyos the invented system. It should be realized that many other arrangements may be readily devised employing the basic invented system concept and that other components may be used in place of the components shown or in addition to these components. The structure and advantages of this invention will be readily understood by reference to the detailed specification which follows along with the drawings wherein:

Figure 1:
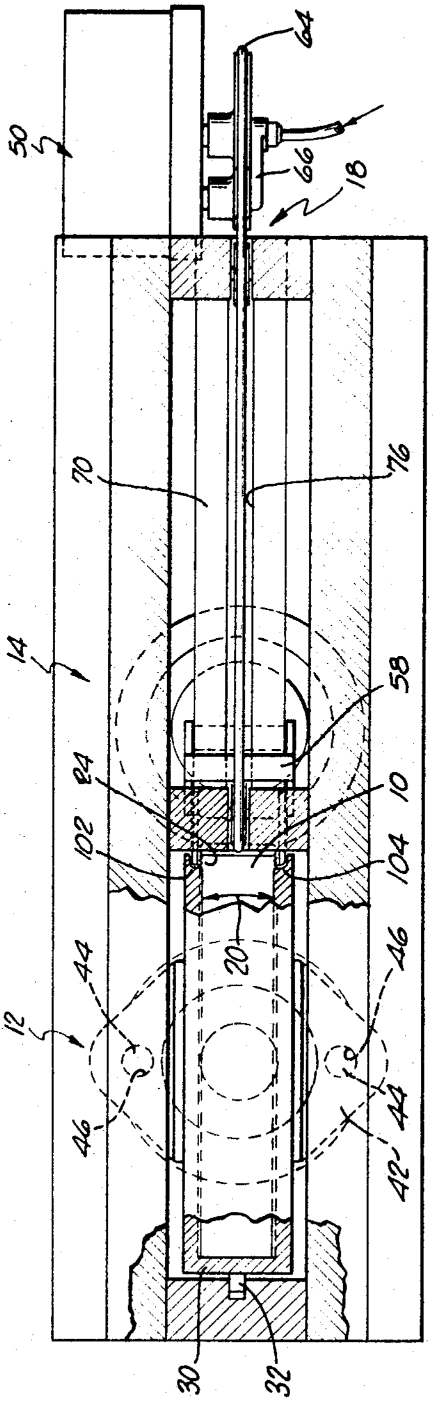
FIGURE 1 is a plan view partly in section showing an embodiment of the invention.
Figure 2:
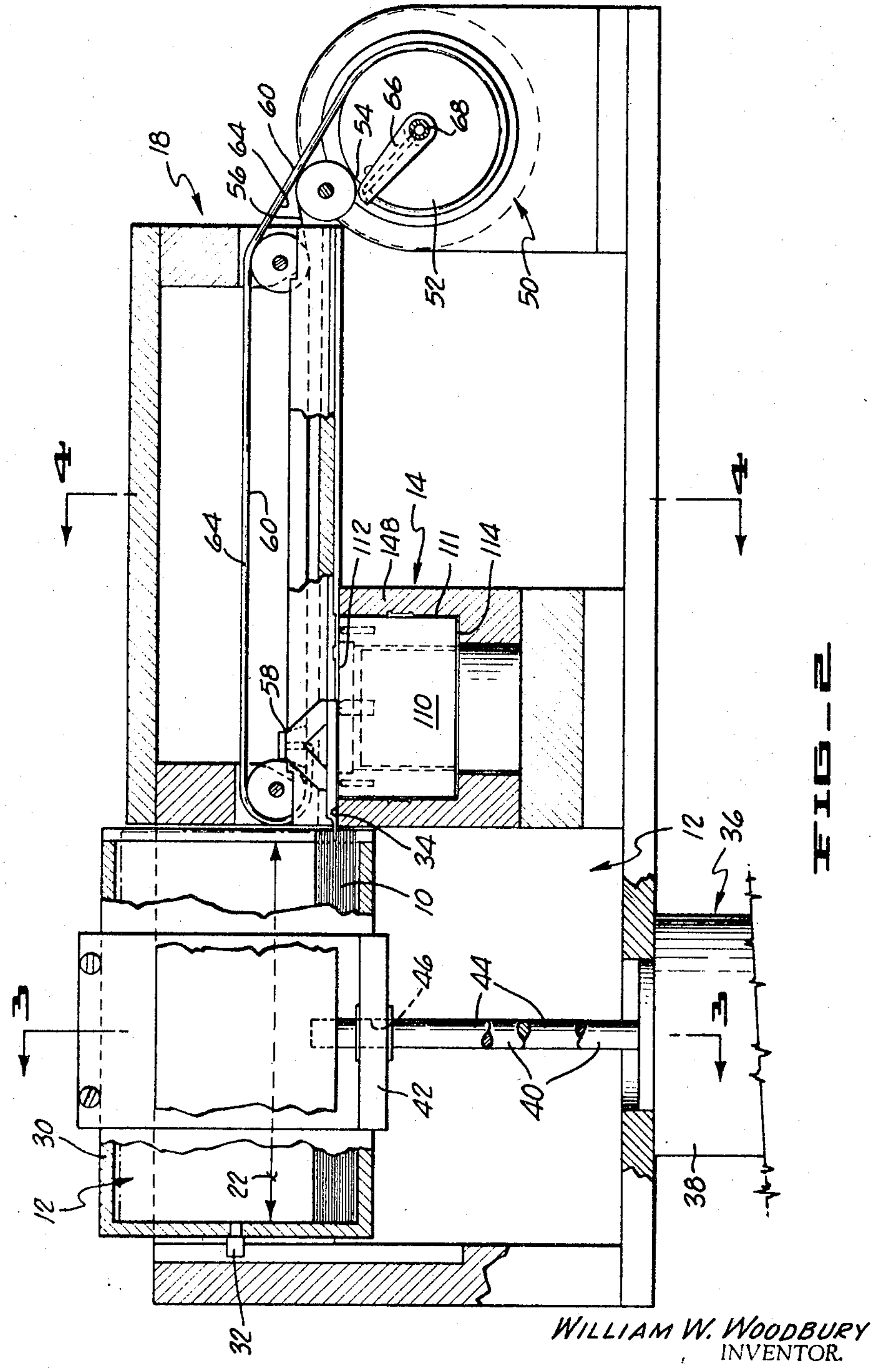
FIGURE 2 is an elevation view partly in section of the embodiment of the invention shown in FIGURE 1.
Figure 3:
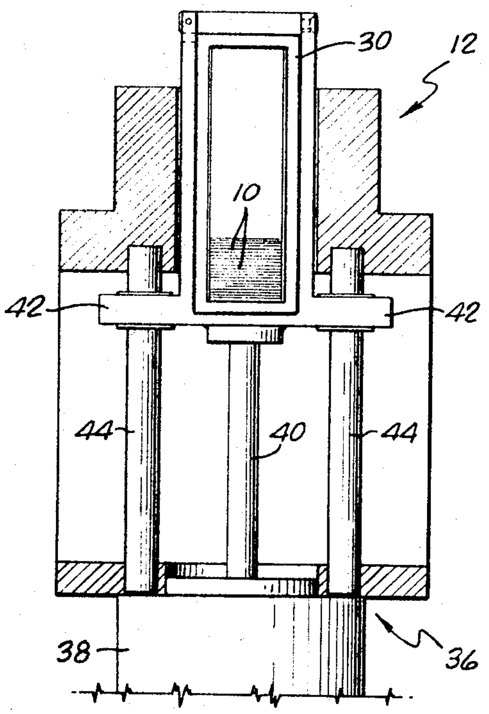
FIGURE 3 is a sectional view taken along the lines 3—3 of FIGURE 2 and showing certain aspects of a means for storing the record plaques and for selecting a particular plaque.

Referring to FIGURES 1–3, the invented random access memory system comprises a plurality of substantially rigid co-planar record plaques 10, means 12 for storing a plurality of plaques 10 and for moving a selected plaque into a plane adjacent the plane of drum means 14, and a means 18 for selectively positioning a plaque to a selected stationary position relative to drum means 14. More specifically, the record plaque 10 preferably includes a support layer that enables the plaque to be pushed or pulled and limits its flexibility so that it may not be bent though contour paths such as 180° bends. The support layer typically may take the form of a thin sheet of magnesium coated with a layer of magnetic material. Typically, this plaque has a weight of less than 1 ounce and a surface area less than 15 square inches with a width 20 under 3 inches and a length 22 under 10 inches.

Figure 6:
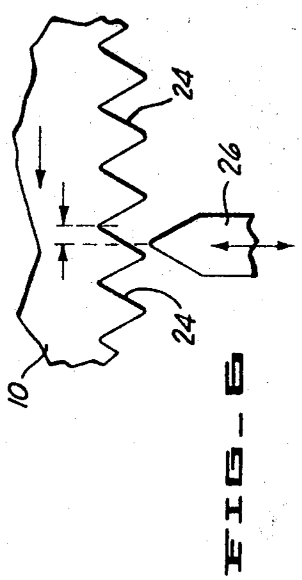
FIGURE 6 is an enlarged view of the record plaque edge and the positioning plunger which completes the precise positioning of the plaque.

Along the sides of record plaque 10 are a plurality of notches 24 (FIGURE 6). The notches 24 at the end of the plaque facilitate the moving thereof, as will be explained later in the specification. The notches along the length of the plaque cooperate with positioning and detenting plunger 26 to precisely position plaque 10 once it has been roughly or approximately positioned by other means and to detent it in the selected position. An alternate embodiment of the invention employs notches 24 to incremently position plaque 10. This is accomplished by positioning a plurality of plungers 26 at different positions relative to notches 24 or by placing variable slope notches 24 along plaque 10 in cooperation with equally spaced plungers or by a combination of such devices.

Figure 5:
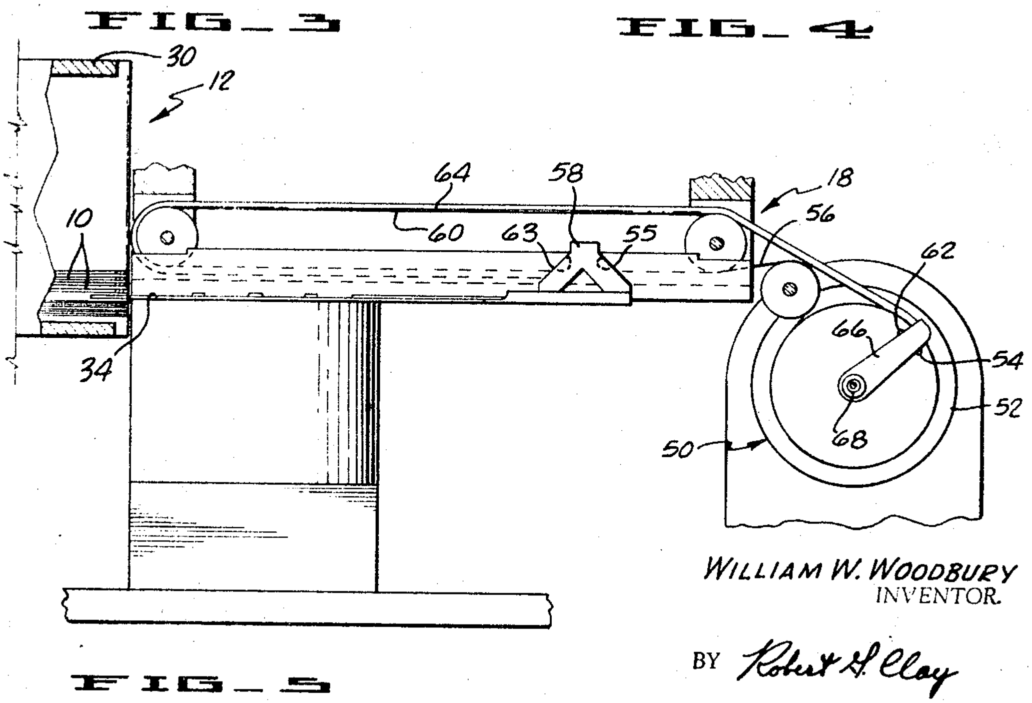
FIGURE 5 is an elevation view partly in section of the means for positioning the plaque to a selected position and showing the cooperative relation between the means for storing the plaque, the drum means and the means for positioning the plaque.

A plurality of plaques 10 are stored in means 12 for storing and selecting a particular record plaque (FIGURES 2, 3, and 5). The means 12 includes a storage bin 30 slidably mounted in guides, such as 32, to move in a vertical direction. The storage bin 30 is constructed to support a plurality of plaques 10 on closely separated vertical levels. When the bin 30 is moved vertically, the plaques 10 stored therein will sequentially pass through a position adjacent the plane 34 coincident with the top surface of drum means 14 (FIGURE 5). The vertical movement of storage bin 30 is provided by moving means 36 for selectively moving bin 30 to a position where a particular plaque 10 is adjacent plane 34. In this position the selected plaque 10 may be removed from bin 30 and transported along a plane adjacent plane 34.

Numerous vertical moving means 36 to the ends of the present invention will suggest themselves to the skilled artisan. In this regard, the moving means may advantageously includes a hydraulic positioning device 38 of the general character disclosed in U.S. Patent No. 2,982, 381, to Norman A. Vogel and William W. Woodbury, which issued May 2, 1961. Briefly, such a device includes a hydraulic slave cylinder having a piston movable therein. A plurality of hydraulic actuating cylinders are arranged in pairs with one cylinder of each pair hydraulically coupled to one end of the slave cylinder and the other cylinder of each pair hydraulically coupled to the other end of the slave cylinder. Oppositely moving pistons in the pairs of actuating cylinders operate to displace fluid of the slave cylinder in opposite directions to effect movement of the piston thereof by amounts determined by the number of pair of actuating cylinders that are actuated. Provision is made for selective actuation of the actuating cylinders to thereby facilitate selective precise incremental displacement of the piston within the slave cylinder.

With a positioning device 38 of the character outlined above, a piston rod 40 secured to the piston of the slave cylinder and extending vertically therefrom is end secured to the center of base 42 of bin 30. Guidance of the bin is facilitated as by means of a pair of fixed vertical guide rods 44 slideably extending through a pair of apertures 46 provided in base 42 adjacent opposite side edges thereof. Thus, the bin 30, and plaques 10 carried therein, are vertically moved and positioned in accordance with signals applied to the positioning device 38.

Means 18 for selectively positioning plaque 10 to a stationary position relative to drum means 14 is shown in FIGURES 1, 2 and 5–7. The means 18 includes a servo controlled motor 50 having a driving hub 52 fixedly connected to the end 54 of steel driving belt 56. The driving belt 56 is anchored at its other end 55 to carriage 58. A second steel driving belt 60 is fixedly connected to the hub 52 at one end 62 and connected to carriage 58 at its other end 63. A tubing 64 overlies the belt 60 and supplies air from the arm 66 attached to rotate with hub 52 to carriage 58. Air is supplied to arm 66 by port 68 which is connected to and rotated along with arm 66.

In operation, when hub 52 is rotated in a clockwise direction (FIGURES 2 and 5) belt 60 will move from a left to right direction as will tube 64. This movement of belt 60 will pull carriage 58 and push plaque 10 from right to left (FIGURES 2 and 5) with the air supply to carriage 58 being maintained during this movement by tube 64. When the motor 50 is driven in a counterclockwise direction, belt 56 is moved from a left to a right direction pulling carriage 58 and pulling plaque 10 from left to right. During this left to right movement the air supply to carriage 58 is maintained by tube 64.

Figure 4:
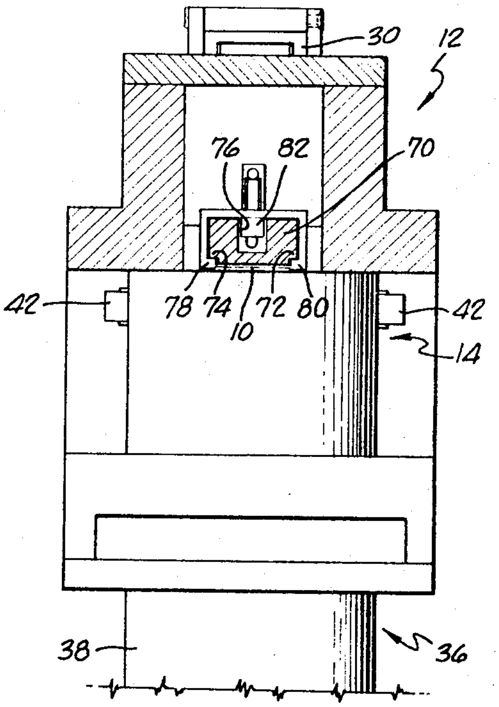
FIGURE 4 is a sectional view taken along the lines 4—4 of FIGURE 2 and showing the drum means and part of the means for positioning the record plaque to a selected position.
Figure 7:
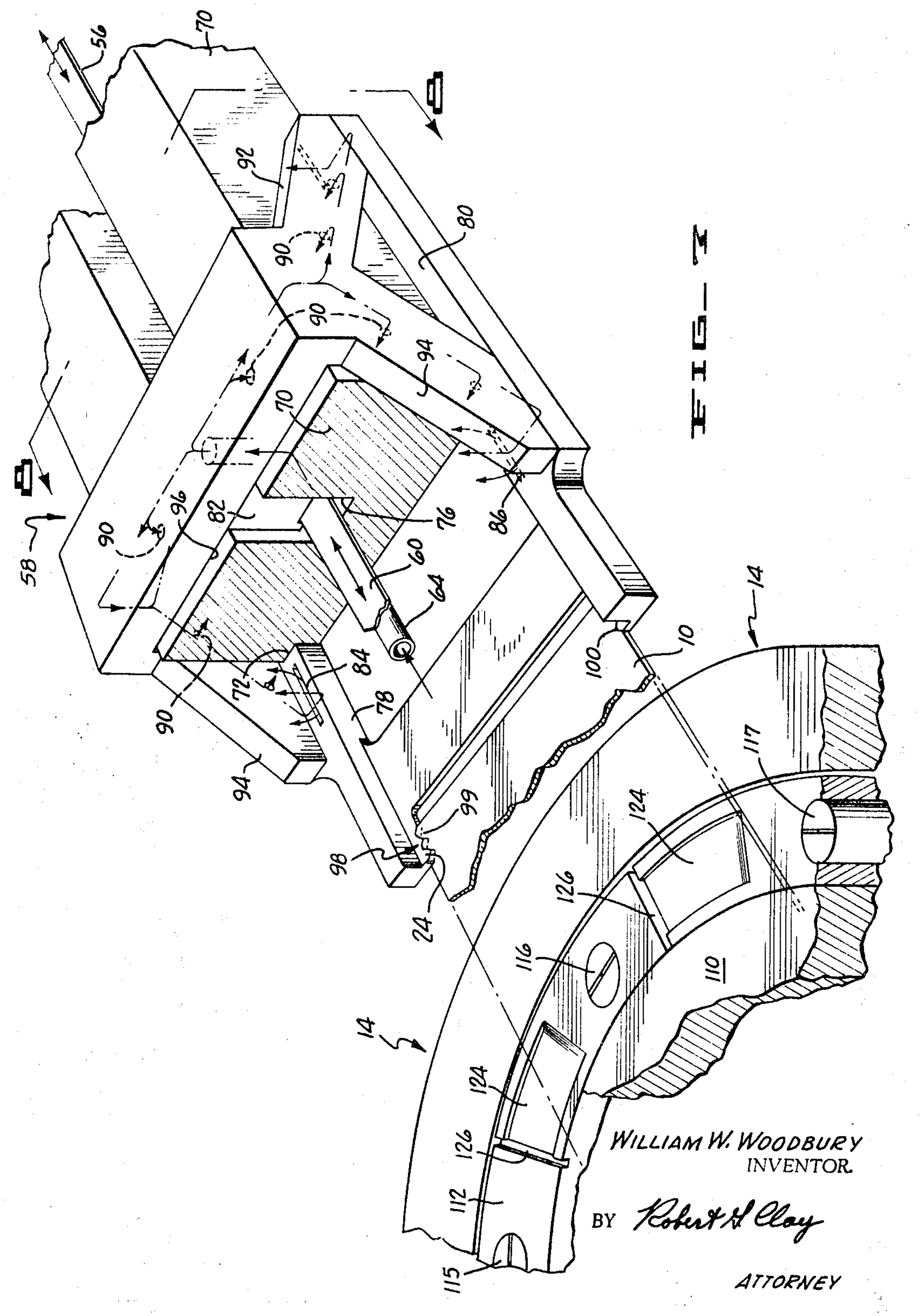
FIGURE 7 is a fragmentary perspective view with portions broken away of the carriage means included in the means for positioning the plaque and its relationship to the drum means with transducers and air bearing recesses.
Figure 8:
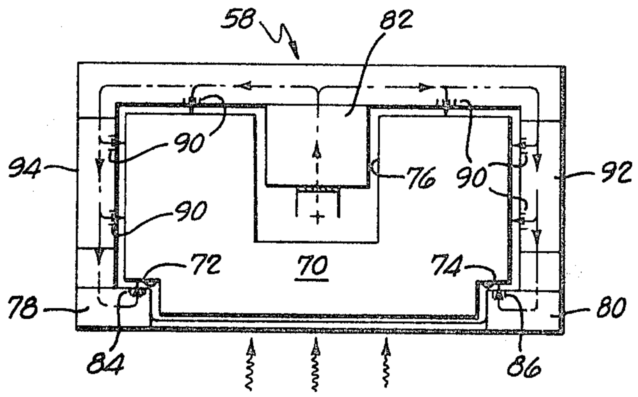
FIGURE 8 is a sectional view taken along the lines 8—8 of FIGURE 7 showing the cooperation between the carriage means and its support along with a schematic showing of the air flow that forms the air bearing for the carriage means.

The carriage 58 is shown in detail in FIGURES 4, 7, and 8. The air supplied to carriage 58 by tube 64 is distributed over its bearing surfaces so as to float same on an air support. This minimizes friction and increases speeds attainable by carriage 58. More specifically, carriage 58 rides on a support member 70 having recesses 72, 74 and 76 for receiving the guide members 78, 80 and 82 of carriage 58. The air supplied to carriage 58 is distributed over its interior surfaces adjacent support member 70 by a plurality of ports and slots. As shown schematically in FIGURES 7 and 8, the surface of guides 78 and 80 adjacent recesses 72 and 74 are air lubricated by slots 84 and 86 with similar slots positioned at the rear of carriage 58. Ports such as port 90 are placed on the inside surface of side pieces 92 and 94 to air lubricate the surfaces of the side pieces adjacent support 70. In a similar manner the top surface 96 of carriage 58 may be lubricated. Thus, it is seen that carriage 58 is floated on an air support and in the illustrated embodiment is pulled to the left or right by belts 56 and 60. Here again, movement of the carriage by means of belts is to be taken as purely exemplary, and it will be appreciated that various alternative means exist for effecting an equivalent function such as hydraulic positioning device of the general character disclosed in U.S. Patent No. 2,982,381.

The carriage 58 has gripping means 98 that may take the form of a plurality of fingers 99 and 100 located on the end of guides 80 and 84 and mating with notches 24 on record plaque 10 (FIGURE 7). When record plaques 10 and storage bin 30 are being moved vertically, then the fingers 99 and 100 are positioned in recesses 102 and 104 (FIGURES 1 and 2) and there is sufficient clearance between fingers 99 and 100 and notches 24 to enable the bin 30 to freely move in a vertical direction. The plaques 10 successively assume a cooperative position with respect to fingers 98 and 99 so that upon actuation of carriage 58 a record plaque may be gripped and removed from bin 30 by the movement of carriage 58 from left to right. The movement of carriage 58 and the cooperation of gripping means 98 is shown in successive stages of operation in FIGURES 1, 5 and 7. FIGURE 1 shows the record plaque in its stored position. FIGURE 7 shows carriage 58 and plaque 10 as they pass over drum means 14. The plaque 10 is shown in its most extreme position in FIGURE 5. When carriage 58 is in its most extreme position in (FIGURE 5), plaque 10 still has one of its ends supported in storage bin 30. This facilitates the movement of plaque 10 in and out of bin 30 and aids in the support of plaque 10 which is primarily performed by the air bearing. The forming of an air bearing is explained in conjunction with the detailed description of the drum means which follows.

The drum means 14 is shown in detail in FIGURES 7 and 9–12 with its cooperative relation with the other components of the system shown clearly in FIGURE 2. The drum means 14 includes a housing 148 and a drum 110 having a circumferential region 111 bounded by a pair of planes 112 and 114. The plane 112 is located adjacent and beneath plaque 10 in substantially parallel relationship thereto. The plane 112 has a plurality of transducers 115–122 mounted thereon in offset relationship, that is, the transducers are divided into pairs of read and write transducers with each pair of transducers placed on a concentric circle having a different diameter. This relationship is clearly seen in FIGURE 12 where read and write transducer pairs 115 and 116 are placed along one concentric circle and read and write transducers 117 and 118 are placed along concentric circle having a smaller diameter. The other transducers are similarly arranged. This arrangement enables a plurality of tracks to be recorded and immediately reproduced during a single revolution of drum 110. It should be understood that it is within the scope of the invention to place each of the transducers on different circles and employ all the transducers as playback or record transducers during a given revolution of drum 110.

Intermediate each tarnsducer are means 124, 126 for separating plaque 10 from plane 112 of drum 110. Preferably, such means may take the form of an air thrust support bearing means for creating an air bearing to support and separate the plaque from plane 112 when drum 110 is rotated. As shown (FIGURE 7) this air bearing means may take the form of a plurality of broad recesses 124 each terminating in a short and deeper recess 126. The detailed design and operation of such air bearing means is well known in the art and described in such publications as "Gas Lubricated Step Thrust Bearing—A Comparative Study" by M. Wildmann et al., Journal of Basic Engineering Transactions—ASME, April 1964, Paper No. 64—Lubs–6. In general, such air bearing means will create a force against plaque 10 that decreases rapidly as the distance between it and the card increases. The general force-distance relationship of such an air bearing means is shown in Curve A of FIGURE 11 with the preferred opearting region in the vicinity of points 1 and 2 of the graph. The use of such an air bearing means enables the surface of plaque 10 adjacent plane 112 to be maintained a precise distance from plane 112. Any changes in the separation at equilibrium will result in a large force being exerted by air bearing means 124 and 126 and consequently rapid corrective action.

Figure 11:
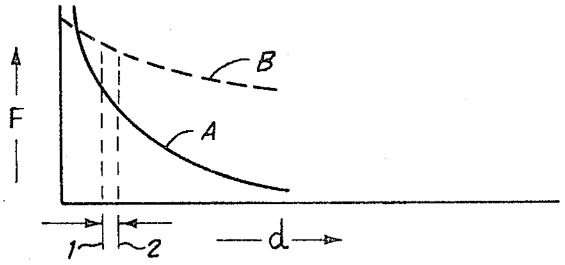
FIGURE 11 is a graph showing the manner in which the forces exerted by the air bearing means and pressure pad vary with distance.

In addition to the air bearing means 124, 126 a pressure pad means 130 (FIGURE 9) is formed as part of support 70. Pressure pad 130 is located adjacent one side of record plaque 10 for applying a pressure thereto. This pressure controls the separation between tarnsducers 115–121 and the surface of plaque 10 adjacent plane 112 of drum 110. The pressure pad 130 may comprise a pair of elongated slots 132 and 134 for supplying air overlying the proximity of the concentric circles along which the transducers are mounted. This locating of the solts 132 and 134 enables the forces to be precisely controlled in the region that such control is most important. Thus, the pressure and force applied to plaque 10 in the vicinity of recording is most precisely controlled, thereby insuring control of the separation between transducers 115–122 and plaque 10. In addition to slots 132 and 134 pressure pad 130 has a plurality of relief grooves defining a plurality of rectangular lands 136, 137, 138, and 139. The general force-distance characteristic of pressure pad 130 is shown in FIGURE 11, Curve B. It can be seen that the force supplied by pressure pad 130 only varies slightly with distance. If plaque 10 is slightly thicker and closer to pressure pad 130 it will not substantially affect the force applied to plaque 10 by the pressure pad. This causes any error in plaque thickness to narrow the separation between the plaque and pressure pad 130 while the separation between the surface of the planque adjacent the tarnsducers remains essentially constant. Such an arrangement facilities reliable recording and reproduction while minimizing the wear of transducers 115–122 and plaque 10. The air bearing formed by thrust bearing means 124, 126 and pressure pad means 130 also facilitates high speed rotation of the drum 110 and rapid positioning of plaque 10. The drum may readily be rotated at speeds of 3,600 r.p.m. Such speeds enable eight tracks of recorded information containing over 8,000 number of bits to be accessed in a period of 8 milliseconds with plaque 10 in a stationary position.

Figure 10:
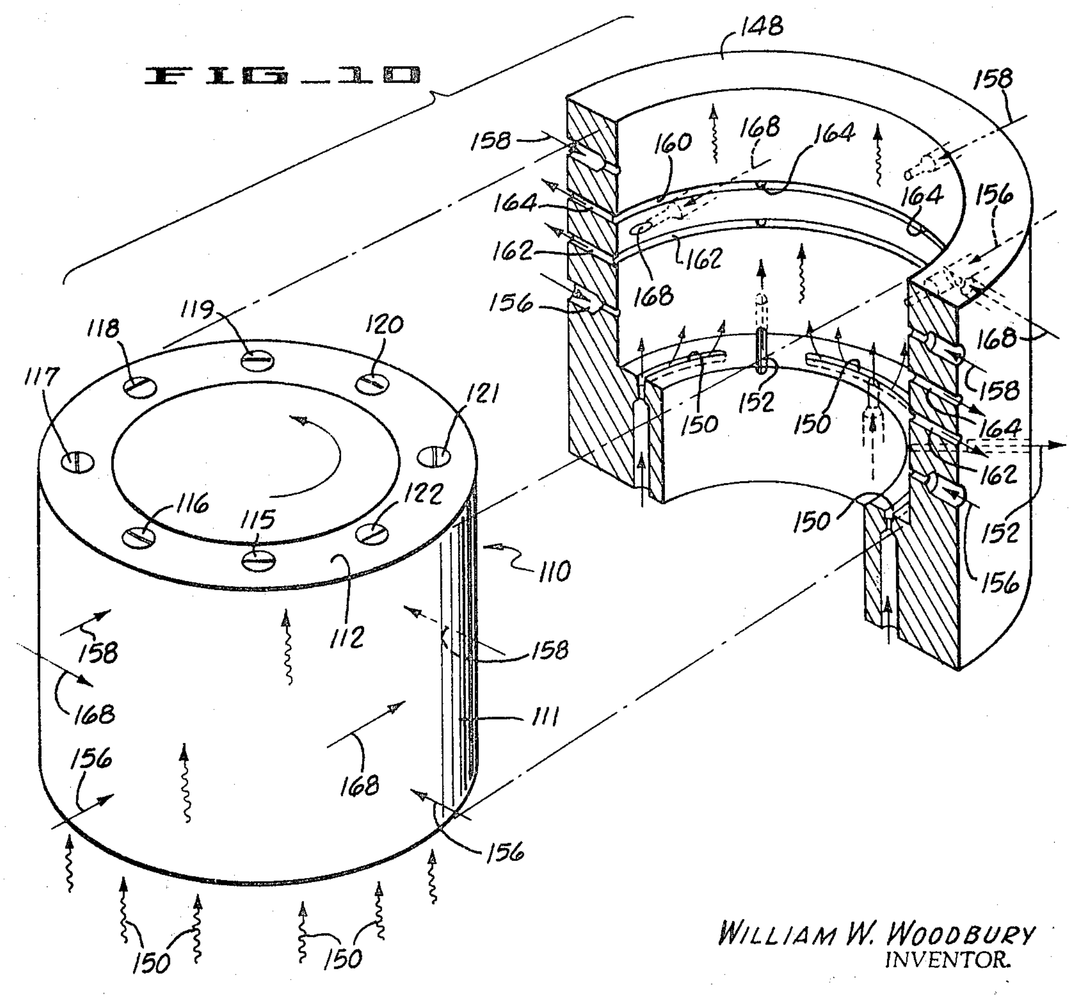
FIGURE 10 is an exploded perspective view of the drum means showing the manner in which it is rotated and supported by fluid means.

The drum 110, as shown in FIGURE 10, is supported in housing 148 by an air bearing. The air bearing support for drum 110 is formed in part by air introduced through slots 150. The slots 150 lie adjacent to the plane 114 of drum 110 and create a force acting on this plane to axially support the drum. The air introduced via slots 150 is vented by port 152 and by leakage around the circumferential region 111 which tends to maintain the force against the plane 114 at a substantially constant level.

A plurality of ports 156 are located on a common plane of housing 148 adjacent slots 150. A second group of ports 158 are located on a common plane of housing 148 adjacent the top surface of housing 148. The air introduced via ports 156 and 158 tends to center drum 110 in housing 148 and tends to prevent any tilting of drum 110.

A pair of grooves 160 and 162 having a plurality of ports 164 and 166 placed therein are positioned intermediate ports 156 and 158 to exhaust any pressure built between ports 156 and 158. Thus the exhaust ports 164 and 166 tend to maintain the pressure along the inner diameter of the housing 148 at a given value.

Figure 13:
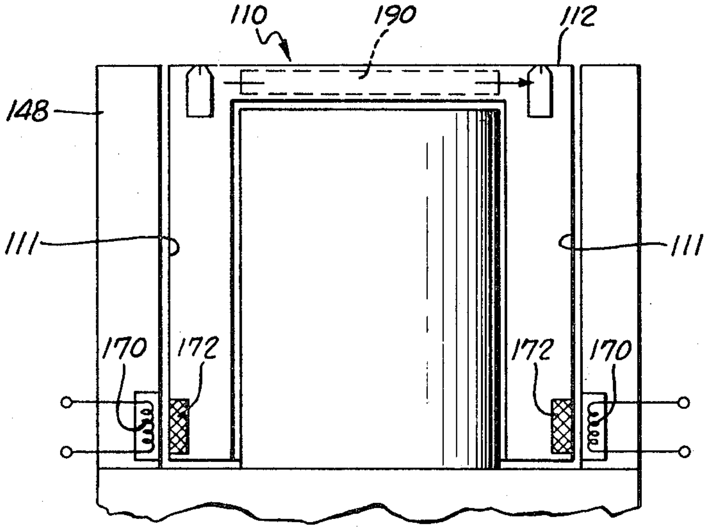
FIGURE 13 is a sectional view of the drum means taken along the lines 13—13 of FIGURE 12 and showing the electrical aspects of the drum construction.
Figure 12:
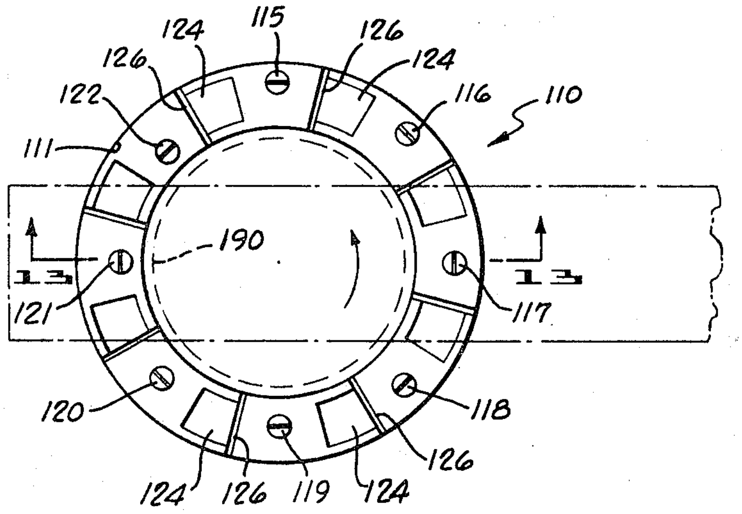
FIGURE 12 is a top view of the drum means showing the location of transducers thereon.

A plurality of ports 168 are provided around housing 148 for rotating drum 110. Ports 168 are directed to tangentially impinge air upon surface 111 of drum 110 to rotate drum 110. It is within the scope of the invention to incorporate blades or other turbine devices to increase the effectiveness of ports 168. It has been found, however, that the port 168 acting against the surface 111 provides adequate driving force for the drum 110 when supported by an air bearing arrangement, as is the invented drum. Thus, the invented drum means may be totally air driven and supported by an air bearing.

Where precise and instantaneous control of the drum speed is desired, the inclusion of motor windings such as stator windings 170 and rotor windings or permanent magnets 172 (FIGURE 13) may be included in the drum means. The permanent magnets 172 are placed at the lower end of surface 111 and spaced evenly around the drum circumference. The stator windings 170 are positioned in housing 148 and located adjacent magnetic field means 172. The energization of windings 170 may be made to precisely control the speed of drum 110 by either braking or adding to the speed of the drum resulting from the air supplied by ports 168.

It will be appreciated that in addition to employment of air jets alone or in combination with electric motor means to rotate the drum, the drum may be rotated by electric motor means alone.

Figure 9:
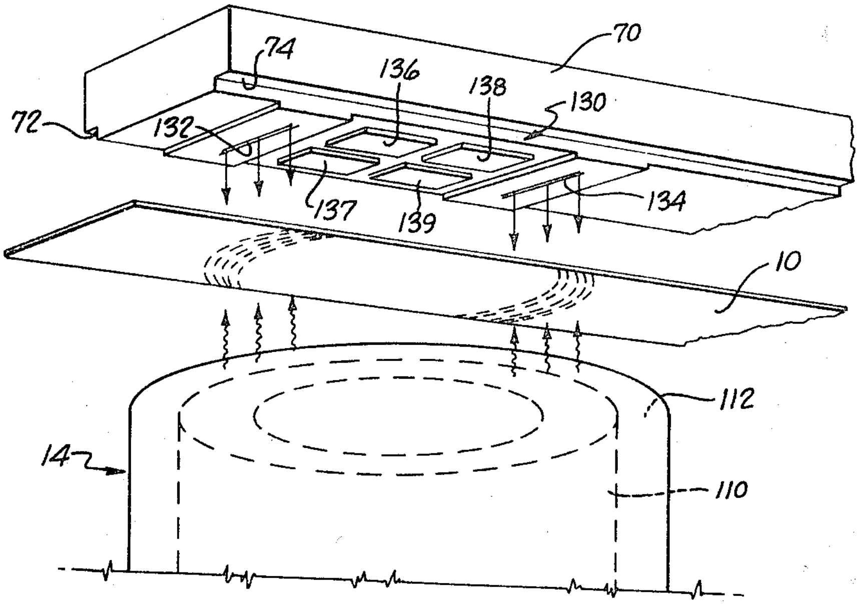
FIGURE 9 is an exploded perspective view of the drum means, record plaque and pressure pad shown in a cooperative relationship.

With the above described structure in mind, the operation of the invented system will now be considered. A typical operational sequence involves first selecting a plaque 10 that is to be processed. This is accomplished by supplying a signal to drive means 36 (FIGURE 2) which moves storage bin 30 to an appropriate level. With bin 30 positioned, notches 24 of the selected plaque and the gripping means 99 and 100 are in a cooperative relationship so that movement of the carriage 58 will remove the selected plaque from bin 30 (FIGURE 7). It should be noted that during the movement of storage bin 30 the notches 24 in plaque 10 freely move over gripping means 99 and 100. With a selected plaque 10 aligned with gripping means 99 and 100, the motor 50 is energized causing hub 52 to rotate in a counter-clockwise direction pulling belt 56 towards the right (FIGURE 2) and moving plaque 10 over drum means 14. The drum 110 is rotated continuously as plaque 10 is moved over its surface. The rotation of drum 110 results in an air bearing being created by bearing means 124, 126. This separates plaques 10 from surface 112. The separation is maintained by pressure pad 130 spaced over plaque 10 (FIGURE 9).

When plaque 10 is in a selected position relative to drum 110, motor 50 is de-energized or disengaged and plunger 26 (FIGURE 6) is energized. Plunger 26 moves into engagement with notches 24 and detents and precisely positions plaque 10. It should be noted that the engagement of plunger 26 with notch 24 will force plaque 10 against one of the gripping means 99 or 100, thus tending to lock the plaque on position. With the plaque fixedly positioned in a selected relationship to transducers 115 to 122, these transducers are energized to perform a read and/or write operation.

Following the read-write operations, plaque 10 is moved to a different selected position and other tracks are written or reproduced. When the processing of one of the plaques 10 is complete, it is then returned to storage bin 30. The storage bin 30 is positioned so that plaque 10 may be re-inserted in its original position. This is facilitated by leaving one end of plaque 10 always in storage bin 30 (FIGURE 5). It is then only necessary for motor 50 to be energized and rotate in a clockwise direction. The counter-clockwise rotation causes belt 60 to move to the right (FIGURE 5) resulting in the pulling of carriage 58 to the left. The carriage 58 in turn pushes plaque 10 back into storage bin 30. With the plaque 10 returned to storage bin 30, another plaque may be selected and similarly positioned in cooperative relation with drum means 14.

It can be seen from the above operational description that a memory system has been provided that is relatively simple in construction and is capable of accessing a large amount of information in a relatively short period of time. Typically any track on any plaque or any of approximately 1,000,000 bits, can be accessed in about 50 milliseconds. This superior performance is achieved in part by employing a plaque 10 that is substantially rigid per se or maintained rigid in operation so that it may be easily pushed and pulled. This feature of the pushing and pulling action decidedly simplifies the transport mechanism. In addition, the use of a rotating drum with stationary heads decidedly simplifies the head construction and eliminates the problem of head skewing incident to a moving transducer in a rotating drum structure. The use of a rigidly maintained plaque and the rotating drum enables an air bearing support to be effectuated. This air bearing support includes a pressure pad and thrust bearing means formed in the drum surface precisely controls the separation between drum 110 and plaque 10. This minimizes wear and facilitates rapid plaque movement and high rotational speeds of drum 10 without sacrificing reliability.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. For example, in many memory applications a table-of-contents memory store is required in addition to the main memory store. The arrangement of the present invention is particularly suited to such applications in that the periphery of the drum may be employed for table-of-contents memory storage. In this regard, the peripheral surface of the drum may be coated with magnetic material and one or more columns of magnetic heads may be mounted in the inner surface of the journal bearing support for the drum to effect reading and writing functions with respect to the magnetically coated drum periphery. In this manner, a combination drum-plaque memory system is provided. It is the intention, therefore, to be limited only as indicated by the scope of the following claims.

What is claimed is:

1. In arandom access memory system having a record magazine; a plurality of magnetic record plaques stored in said magazine; a drum means mounted for rotation about its principal axis and having a circumferential region bounded at at least one end by a planar end surface; a plurality of transducers for recording information on and reading out information from said record plaque mounted on said planar end surface for orbiting in a plane about the axis of rotation of said drum means to scan record plaques during the rotation of said drum means; means for transferring a selected one of said record plaques from said magazine into position parallel to the plane of transducer orbit into operative relation with said transducers; and means for indexing said record plaques relative to said transducers whereby information may be rapidly recorded on and read out from arcuate tracks on said record plaque; the improvement comprising said transducers rigidly mounted on said planar end surface to be immobile relative to said planar end surface; at least one of said transducers located at a different radial distance from the axis of rotation of said drum means than the other transducers; said means for transferring said record plaques into operative relation with said transducers including means for translating said record plaques diametrically of said drum means adjacent to said planar end surface so that said radially displaced transducers scan different arcuate paths across said record plaques as said drum means is rotated to record information on and read out information from different arcuate tracks on said record plaques, and means for positioning and indexing said record plaques at selected stationary positions relative to the diameter of said drum means so that each of said radially displaced transducers record information on and read out information from different arcuate tracks along said record plaques when said record plaques are located at the different selected stationary positions; and each of said magnetic record plaques having a magnetic recording medium on a surface thereof, said magnetic recording medium having a dimension transverse to the direction that the record plaques are translated diametrically of said drum means which is less than the diameter of said drum means.

2. The structure recited in claim 1 wherein said transducers are arranged on said planar end surface of said drum means in pairs one of which is a record transducer and the other a read out transducer, the transducers of each pair are located at identical radial distances from the axis of rotation of said drum means to scan the same arcuate paths across the transverse dimension of the record plaques as the drum means is rotated, and the transducers of each pair are located at a different radial distance from the axis of rotation of said drum means than those of the other pairs so that each pair of transducers scan different arcuate paths across the transverse dimension of the record plaques as the drum means is rotated.

References Cited

UNITED STATES PATENTS

| | | | |
|---|---|---|---|
| 2,899,260 | 8/1959 | Farrand et al. | 340—174.1 |
| 3,144,642 | 8/1964 | Treseder | 340—174.1 |
| 3,303,485 | 2/1967 | Lee | 340—174.1 |
| 3,329,941 | 7/1967 | Lauxen | 340—174.1 |

FOREIGN PATENTS

| | | |
|---|---|---|
| 937,641 | 9/1963 | Great Britain. |
| 903,633 | 8/1962 | Great Britain. |

OTHER REFERENCES

IBM Technical Bulletin, vol. 4, No. 5, October 1961, p. 78.

BERNARD KONICK, *Primary Examiner.*

B. L. HALEY, *Assistant Examiner.*